March 27, 1934. J. V. RESEK ET AL 1,952,683
VALVE
Filed Sept. 24, 1932 5 Sheets-Sheet 1
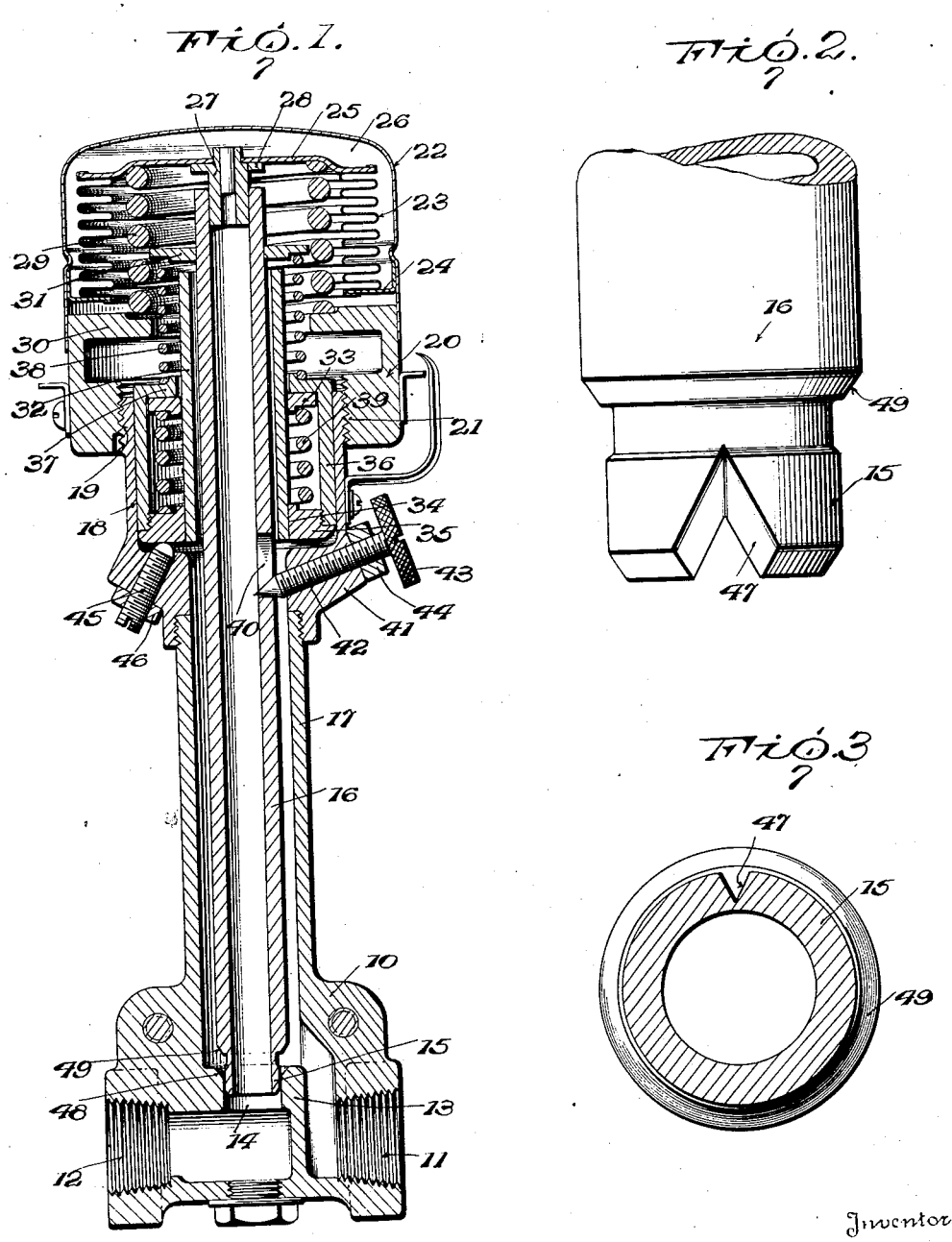
Inventors
Jules V. Resek
William W. Carson, Jr.
By Cameron, Kerkam & Sutton
Attorneys March 27, 1934.  J. V. RESEK ET AL  1,952,683
VALVE
Filed Sept. 24, 1932   5 Sheets-Sheet 2
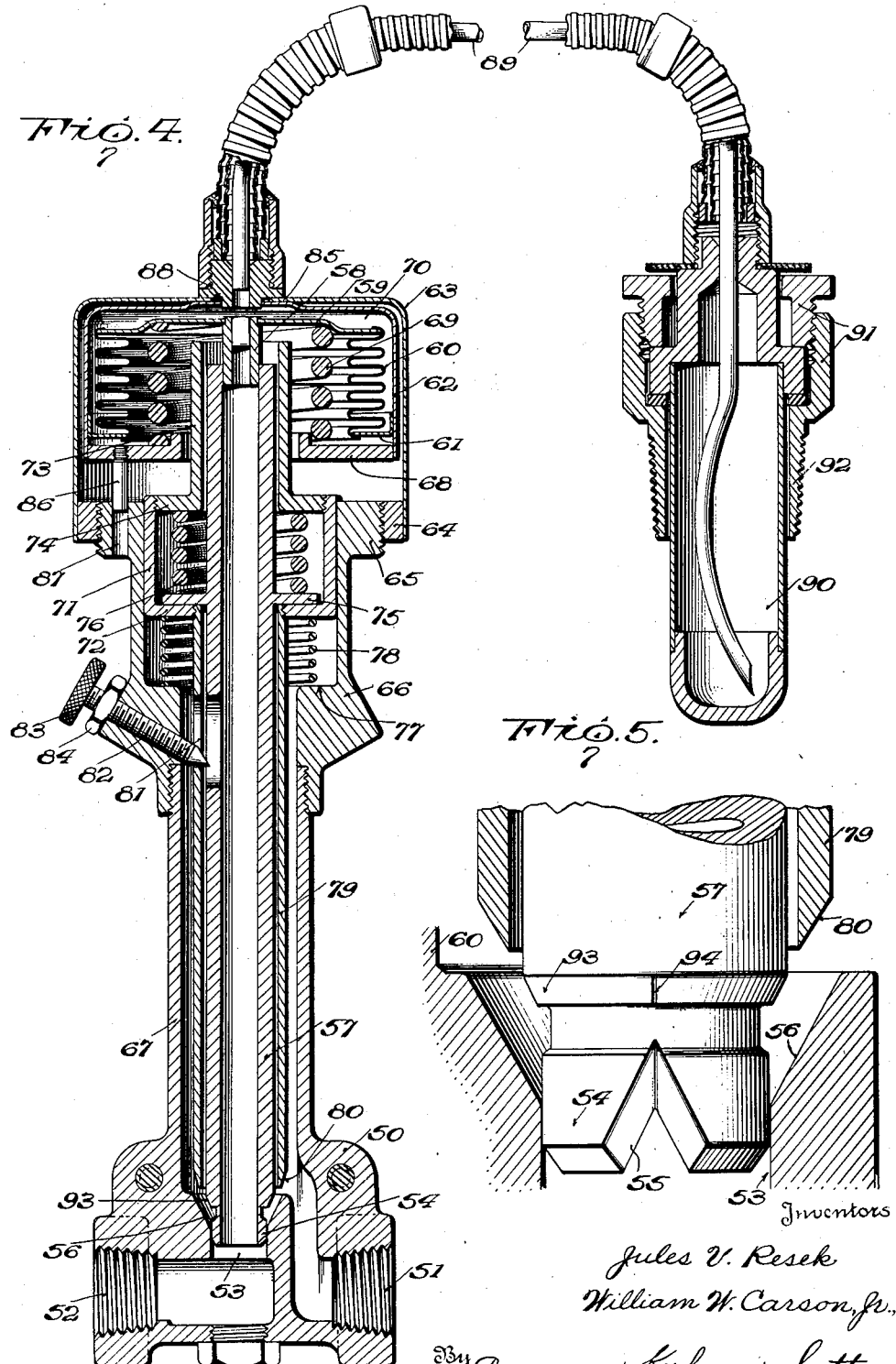

March 27, 1934.   J. V. RESEK ET AL   1,952,683
VALVE
Filed Sept. 24, 1932   5 Sheets-Sheet 4

Inventors
Jules V. Resek
William W. Carson, Jr.
By Cameron, Kerkam & Sutton
Attorneys March 27, 1934.  J. V. RESEK ET AL  1,952,683
VALVE
Filed Sept. 24, 1932  5 Sheets-Sheet 5

Inventors
Jules V. Resek
William W. Carson, Jr.,
By Cameron, Kerkam & Sutton
Attorneys Patented Mar. 27, 1934

1,952,683

UNITED STATES PATENT OFFICE 1,952,683

VALVE

Jules V. Resek and William W. Carson, Jr., Knoxville, Tenn., assignors to The Fulton Sylphon Company, Knoxville, Tenn., a corporation of Delaware Application September 24, 1932, Serial No. 634,754

49 Claims. (Cl. 236—99)

This invention relates to automatic valves, and more particularly to a thermostatic metering valve for use in conjunction with oil burners.

It is an object of this invention to provide an improved device of the type characterized which will accurately and sensitively vary the flow of oil in accordance with variations in the temperature of the room, tank, vat, or other compartment being heated by the combustion of the oil.

Another object of this invention is to provide an improved device of the type characterized which will maintain a maximum flame until the room, tank, vat or other compartment being heated is substantially at the desired temperature and which will thereafter adjust the size of the flame so as to substantially maintain the desired temperature.

Another object of this invention is to provide an improved device of the type characterized wherein, except under exceptional conditions, the amount of oil supply will not be diminished below the minimum necessary for the maintenance of a proper flame.

Another object of this invention is to provide an improved device of the type characterized whereby under exceptional temperature conditions the device will automatically shut off completely the flow of oil.

Another object of this invention is to provide an improved device of the type characterized with means which will prevent the development of improper pressures in the thermostatic control, even though the temperature continues to rise after the valve has been moved to its position for a minimum flame or to close the valve completely.

Another object of this invention is to provide an improved device of the type characterized with readily adjustable means for determining the temperature at which the diminishing of the size of the flame is commenced.

Another object of this invention is to provide an improved device of the type characterized with adjustable means for predetermining the maximum size of the flame, or the minimum size of the flame, or both.

Another object of this invention is to provide an improved device of the type characterized with means whereby the device may be readily set to determine the oil flow for maintaining the maximum and minimum flames with regard to the particular characteristics of the oil being burned.

Another object of this invention is to provide an improved device of the type characterized which can be closed manually so as to shut off completely the flow of oil.

Another object of this invention is to provide a device of the type characterized which is efficient in operation, rugged and durable in construction, and easy to install and adjust.

Other objects of the invention will appear as the description proceeds.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Referring in detail to the accompanying drawings, wherein corresponding parts are designated by the same reference characters, Fig. 1 is an axial section of an embodiment of the present invention;

Fig. 2 is an enlarged fragmentary view of the valve member;

Fig. 3 is a transverse cross section of the valve member of Fig. 2;

Fig. 4 is an axial section through a second embodiment of the invention;

Fig. 5 is an enlarged fragmentary view of the valve member of Fig. 4;

Figure 6:
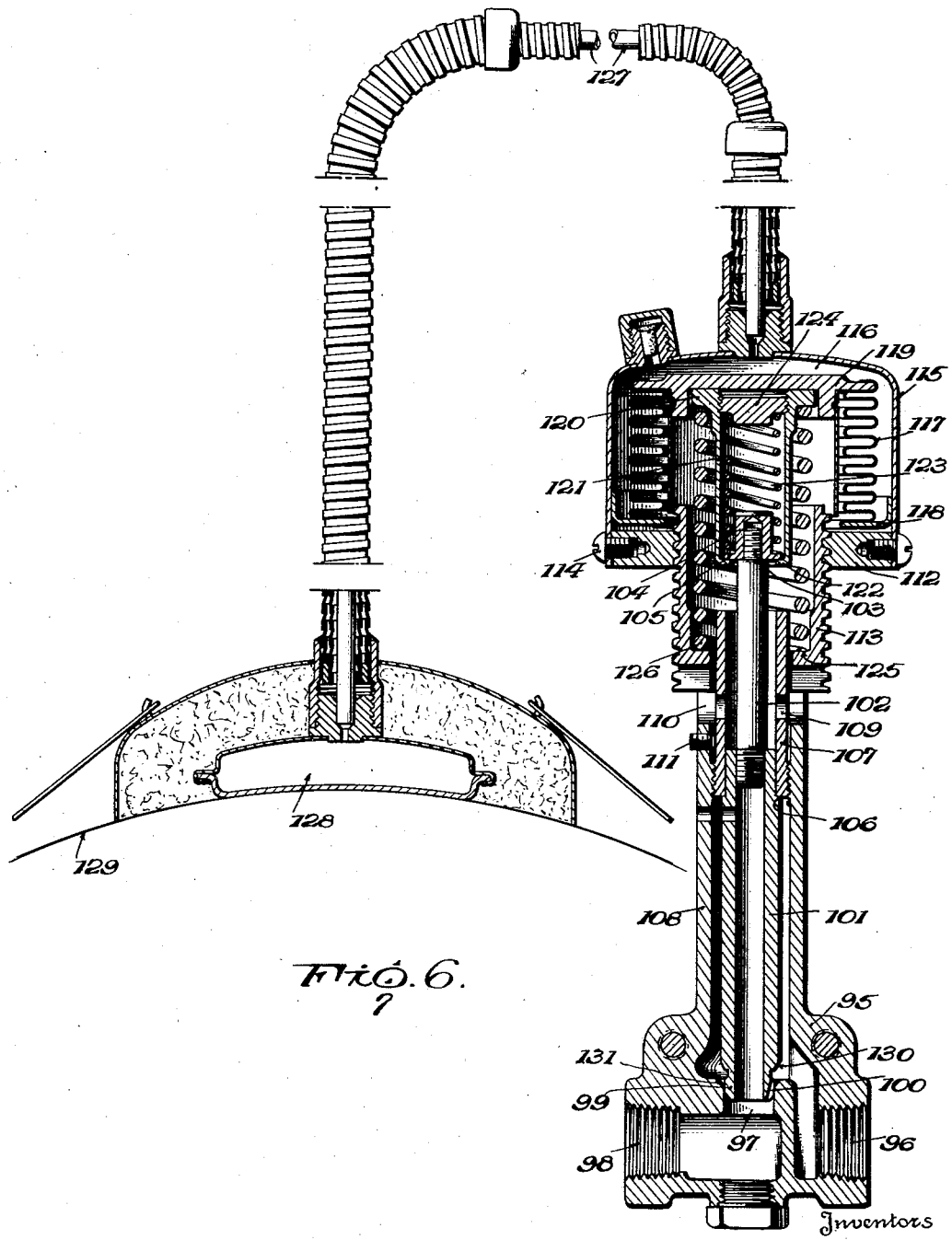
Fig. 6 is an axial section of another embodiment of the present invention.

In the form shown in Figs. 1, 2 and 3 any suitable valve housing 10, provided with an inlet aperture 11, may be suitably connected with any appropriate source of oil, and has an outlet aperture 12, which may be suitably connected with any appropriate burner. Within the valve housing 10 is a partition 13 provided with a port 14. Slidably mounted within the port 14, and preferably making a relatively close fit therewith, is the guide portion 15 of a valve member hereinafter described more in detail. The valve member is either formed on or attached to a suitable stem 16, here shown as tubular in construction to vent the outlet side of the valve from air in the oil, but it could be made solid in cross section if preferred, and which extends axially through a tubular extension 17 of the valve housing into cooperative relationship with the thermostatic control mechanism next to be described.

Mounted on the tubular extension 17, or formed integrally therewith, is a housing member 18 shown as provided with an exterior thread 19 at its opposite end. Mounted on the housing member 18 is a second member 20 provided with an interior thread 21 for cooperation with the thread 19, whereby said member 20 may be moved axially of the member 18 by rotation thereon. Mounted on said member 20 and attached thereto in any suitable way is a thermostat, said thermostat together with the member 20 constituting a unit rotatable on the housing member 18 for purposes of adjustment as hereinafter explained.

The thermostat may be of any suitable construction, but as here shown it takes the form of an expansible and collapsible chamber provided with a flexible corrugated tubular wall 23 attached at one end to an annular member 24 that is hermetically sealed to the housing wall 22 in any suitable way, and closed at its opposite end by a relatively rigid end wall 25. In the embodiment as shown the outer wall of the thermostat 22 forms the external wall of the device and the thermostat is of the cup-type construction, but if preferred, and as shown in other embodiments, the thermostat may be enclosed within an external housing wall, or the thermostat may be of the character wherein the corrugated wall forms the outer wall thereof. As shown, the chamber 26 between the flexible wall 23 and the outer wall 22 constitutes an expansible and collapsible chamber and this chamber is charged with any suitable volatile fluid.

End wall 25 is shown as provided with a nipple 27 adapted to have telescopic movement within the bore of the tubular valve stem 16, and said nipple 27 has a flange 28 which is normally spaced from but which is adapted to engage the end of the valve stem 16 when the flexible wall 23 has been collapsed to a predetermined extent, or if preferred the end wall 25 itself may constitute the means for engaging the end of the valve stem. In order to hold the flexible wall 23 in its normally expanded position a coil spring 29 is interposed between the end wall 25 and an annular spring seat 30, here shown as a wall forming an integral part of the member 20.

Fixedly secured to the valve stem 16 is a flange 31, and disposed in the path of said flange, but normally spaced therefrom, is a tubular sleeve 32 which has fixedly secured thereto a flange 33. Said sleeve 32 is mounted to slide in the bore 34 of a spring retaining collar 35 suitably formed on or attached to an outer sleeve 36 which may reciprocate within the chamber of the housing member 18. Sleeve 36 has formed thereon or suitably attached thereto a flage 37 which overlies and is normally engaged with the flange 33, and interposed between the flanges 31 and 37 is a coil spring 38. A coil spring 39 is also interposed between the flanges 33 and 35.

Valve stem 16 is provided with a slot 40 and rotatably and adjustably mounted in a boss 41 attached to or formed on the housing member 18 is a set screw 42 having a knurled head 43 and lock nut 44. Said set screw 42 is so inclined to the axis of the valve stem 16 that by advancing or withdrawing said set screw with respect to the slot 40 an adjustable stop for the end of said slot 40 is provided. The end of the slot 40 is normally held in contact with the set screw 42 by the coil spring 38. Also mounted in the housing member 18 is a second adjustable set screw 45 provided with a lock nut 46 which extends into cooperative relationship with the flange 35 and forms an adjustable abutment for said flange.

The guide portion 15 of the valve member is provided with an inverted V-shaped slot 47, as shown in Figs. 2 and 3, so that as said portion 15 is withdrawn or advanced with respect to the port 14 and its conically inclined valve seat 48 the area of the aperture by which the oil may flow past the valve member and through the port 14 can be accurately predetermined. Above guide portion 15 the valve member has a conical seating portion 49 having the same angularity as the seat 48, and adapted under certain conditions, as hereinafter explained, to engage said seat and completely close the port 14.

Under normal conditions the valve stem 16 is held by spring 38, coacting with the flange 31 fixedly attached to said valve stem, so that the end of the slot 40 is in contact with the set screw 42, and in this position the valve member is in its position for the maximum flow of oil through the V-shaped slot 47. The magnitude of the maximum flame so produced can be nicely adjusted by means of the set screw 42 to vary the position of the valve member with respect to its port and therefore the effective area of the slot 47 through which the oil may flow.

When the medium to which the thermostat is subjected, as the surrounding air, is below the desired temperature, the wall 25 of the thermostatic chamber 26 is held by the spring 29 in the relative position shown in Fig. 1, i. e. with the flange 28 spaced from the end of the valve stem 16, and the maximum flame as predetermined by the set screw 42 is continued as long as said medium is below the desired temperature. When said medium approaches the desired temperature the volatile fluid in chamber 26 increases its vapor tension sufficiently to move the wall 25 against the tension of the spring 29 toward the end of the valve stem 16, and when the predetermined temperature is reached flange 28 carried by wall 25 is in engagement with the end of the valve stem 16. Any further increase in temperature is therefore productive of a further expansion of the chamber 26, and the wall 25 moves the valve stem 16, against the tension of the spring 38 and spring 29, to advance the valve portion 15 into the port 14 and thereby reduce the cross sectional area of the slot 47 through which oil may flow to the burner. In this manner the area of the slot 47 is adjusted to such a position that the amount of oil flowing to the burner is accurately determined for the maintenance of the desired temperature, said valve portion 15 being thereafter slightly advanced or withdrawn, in the event of any fluctuation in the temperature, so as to accurately adjust the flame to the production of such heat as is necessary to the maintenance of the desired temperature.

If the temperature continues to rise the flange 31 is eventually brought into engagement with the end of the sleeve 32, and in this position the valve portion 15 has been advanced into port 14 sufficiently so that only so much of the V-shaped slot 47 is effective as is proper for the maintenance of a minimum flame to prevent the burner from becoming extinguished. This latter position of the valve portion 15 with respect to its seat can be adjusted with regard to what is proper for the maintenance of a minimum flame by adjustment of the set screw 45, which will advance or withdraw the sleeve 36 with its flanges 35 and 37, and therefore the sleeve 32, because the flange 33 is normally held against the flange 37 by the spring 39.

In order to provide for the valve being completely closed upon the occurrence of exceptional conditions, such as a very large rise in temperature after the flame has been reduced to its minimum, the continued increase of the pressure within the chamber 26 and the transference of this pressure through the valve stem 16 and its flange 31 to the sleeve 32 will cause said sleeve to move inwardly, together with its flange 33, against the tension of the spring 39. Thereby the valve stem 16 can be moved until its conical seating portion 49 eventually engages the seat 48 and completely closes the opening through the port 14. Prior to the time that the seating portion 49 engages the seat 48 the yielding of the spring 39 prevents the building up of an undesirable pressure within the chamber 26.

The member 20 with the thermostat carried thereby can be rotated manually on the housing member 18 to increase or reduce the space between the flange 28 and the end of the valve stem 16, and thereby predetermine the temperature at which the wall 25 starts to move the valve member. Furthermore, by manually rotating the member 20 on the housing member 18, the flange 28 may be advanced into contact with the valve stem 16 and then further advanced until the valve stem moves its seating portion 49 into contact with the seat 48, thereby providing a manual means for entirely closing the valve.

It will be noted that prior to the predetermined temperature at which the movement of the valve member is initiated the thermostatic chamber 26 is being expanded against the tension of the spring 29. After the flange 28 engages the end of the valve stem 16 the further expansion of the chamber 26 and the movement of the valve member is against the combined tensions of the springs 29 and 38. After the flange 31 has engaged the end of the collar 32, the further movement of the valve member to take care of undue pressures within the thermostat and eventually to close completely the valve member is against the combined tensions of the springs 29, 38 and 39. There is therefore a successive and progressive addition of spring tensions, to resist the expansion of the thermostatic chamber at predetermined temperatures, as the thermostatic chamber continues to expand, and the interims between the addition of the tensions to oppose movement of the valve member can be nicely adjusted, thereby predetermining the temperatures at which these additions of spring resistance are effected. This enables not only the predetermining of the maximum and minimum flames but also the temperature at which the valve mechanism begins to operate and the temperature at which the minimum flame will be extinguished.

In the form shown in Figs. 4 and 5 the valve housing 50 is provided with an inlet aperture 51, an outlet aperture 52 and a valve port 53 as in the embodiment heretofore described. The guiding valve portion 54 has an inverted V-shaped slot 55 as shown in Fig. 5, for the purposes heretofore explained, but in this embodiment the valve seat 56 is of greater area for a purpose hereinafter explained. The valve member also has a conical seating portion 93, but in this embodiment said seating portion 93 is provided with a narrow groove or slot 94 appropriate for the maintenance of the desired minimum flame. The valve stem 57 is again shown as tubular and receives telescopically a nipple 58 on the end wall 59 of a thermostatic motor of the cup-type composed of said end wall 59, a corrugated flexible wall 60 suitably secured thereto at one end and to an annular member 61 at its opposite end, which member 61 is suitably sealed hermetically to an outer wall 62. In this embodiment a separate outer housing wall 63 is provided for a thermostat, and it is suitably attached to an interiorly threaded collar 64 mounted on the threaded flange 65 of a housing member 66 formed on or suitably secured to the end of the tubular housing extension 67.

In this construction as shown, the thermostat wall 62 is extended beyond the annular member 61 and is fixedly attached to an inwardly extending spring retaining collar 68, and interposed between said collar 68 and the end wall 59 is a coil spring 69 which predetermines the vapor tension within the chamber 70 necessary for said chamber to start to expand.

Slidably mounted within the housing member 66 is a sleeve 71 having attached thereto or formed integrally therewith an inwardly directed flange 72. Also carried by said sleeve 71 is a second sleeve 73, here shown as formed integrally with a flange 74 suitably attached to the sleeve 71. Sleeve 73 extends outwardly into adjacency with the end wall 59, into a position where it will be engaged thereby as said end wall moves under expansion of the chamber 70, although if preferred the nipple 58 could be provided with a flange for engagement with the end of the sleeve 73 as in the embodiment of Fig. 1. Formed on or fixedly secured to the stem 57 is a flange 75, and between said flange and the flange 74 is interposed a coil spring 76 which normally holds flanges 72 and 75 in contact. Interposed between the flange 72 and an inner shoulder 77 in the housing member 66 is a coil spring 78. Fixedly attached in any suitable way to the flange 72 is a sleeve 79 which surrounds the valve stem 57 and extends into adjacency with the valve seat 56, where it is provided with a tapered portion 80, of the same taper as said valve seat 56, for a purpose to be explained. Sleeve 79 has a slot 81, and cooperating therewith is a set screw 82 having a knurled head 83 and a lock nut 84 for adjusting the position of the parts as hereinafter explained.

Housing 63 is swivelly connected to the thermostat wall 62 at 85, so that it may rotate with respect thereto. Flange 68, however, is provided with an axially extending pin 86 which is engaged in an aperture 87 in the housing member 66 so that the thermostat may move axially but not rotatably when the housing 63 is rotated so as to move the collar 64 inwardly or outwardly with respect to the flange 65.

Sealed in the thermostat wall 62 at 88 is the end of a conduit 89 of any suitable construction, here shown as flexible, said conduit extending to and projecting within a bulb 90 having a suitable housing 91 provided with a threaded sleeve 92 whereby the same may be secured within an aperture in the wall of any suitable tank, vat or other container. Bulb 90, conduit 89 and chamber 70 are charged with a suitable volatile fluid.

In operation, and when the temperature to which the bulb is subjected is below that to be maintained, the parts are in the relative position shown in Fig. 4. The valve portion 54 is in that position predetermined for the maximum flame, and the size of this flame can be adjusted by means of the set screw 82, because the system composed of the sleeves 79, 71 and 73 is normally held by the spring 78 with the end of the slot 81 engaged with the set screw 82, while the flange 75 is held in contact with the flange 72 by the spring 76. Therefore, by adjusting the set screw 82, the position at which the sleeve 79 and therefore the valve stem 57 is normally held may be varied.

As the temperature to which the bulb 90 is subjected increases the vapor tension in the bulb 90, flexible conduit 89 and chamber 70 also increases, and when said tension is sufficient to overcome the tension of the spring 69 wall 59 starts to move toward the end of the sleeve 73, and this continues until the temperature approaches that which it is desired to maintain. The distance between the wall 59 and the end of the sleeve 73 can be varied by rotating the thermostat housing 63 on the threaded flange 65 to move the thermostat toward or away from the sleeve 73, the housing 63 swiveling with respect to the thermostat, which is itself held against rotation but not axial movement by the pin 86 in the slot 87. When the temperature reaches that to be maintained wall 59 engages the end of the sleeve 73, and any further increase in temperature causes said sleeve, together with the sleeves 71 and 79, and the valve stem 57 which must move therewith because of the spring 76, to advance toward the valve seat 56. This movement progressively decreases the cross section of the slot 55 through which the oil may flow, and if the rise in temperature continues the seating portion 93 of the valve member will eventually engage the seat 56. In this embodiment this is the position for maintaining the minimum flame, as the ingress of fuel is now determined by the area of the slot 94. It will be noted that this movement of the valve member toward its seat is opposed by the combined action of the springs 69 and 78.

If the temperature continues to increase after seating portion 93 has engaged the seat 56 sleeves 79, 71 and 73 may still advance, but as flange 75 is now stationary, this advance is against the tension of the spring 76. This further expansion of the chamber 70 against the tensions of the springs 69, 76 and 78 prevents the development of undue pressures within the thermostat. A continued rise in temperature and pressure will eventually bring the conical seat 80 at the end of the sleeve 79 into engagement with the seat 56 and thereby completely close the port 53. This same closure of the port 53 can be obtained by manually rotating the thermostat housing 63, as will be apparent. Therefore, as in the earlier embodiment described springs are brought into action successively to oppose the expansion of the thermostat, and the construction not only provides for predetermined maximum and minimum flames but also provides for adjusting the temperature at which the device begins to work and for the complete closure of the valve upon the occurrence of exceptional conditions that demand the extinguishment of the minimum flame.

In the form shown in Fig. 6 the valve housing 95 has an inlet opening 96, a port 97 and an outlet opening 98. Slidably mounted in the port 97 is the guide portion 99 of a valve member which has a V-shaped slot 100 as heretofore described. The valve member is also provided with a conical seating portion 130 adapted to engage a conical seat 131. Said conical seating portion 130 may be provided with a narrow slot or groove to provide for a minimum flame as in the embodiment of Fig. 4, or the minimum flame may be provided by the V-shaped slot 100, as in the embodiment of Fig. 1, in which case seating portion 130 may be ungrooved so that when in contact with the seat 131 it will completely close the passage through the port 97. The valve stem 101 has an extension 102 formed thereon or suitably attached thereto, as by threads, and said extension is shown as threaded at its extremity 103 and carrying a spring retaining flange in the form of a cap 104 threaded onto the said portion 103 and provided with a flange 105. Valve stem 101 is provided in any suitable way with a shoulder 106 which is adapted to engage an adjustable interior sleeve 107, here shown as threaded into the tubular extension 108 of the valve housing. Sleeve 107 is provided with apertures 109 and the housing extension 108 is provided with one or more apertures 110 so that a suitable tool may be inserted into the apertures 109 for the purpose of rotating the sleeve 107 and therefore adjusting the same axially of the extension 108 to advance or withdraw the end of the sleeve 107, thereby providing an adjustable abutment for the shoulder 106 on the valve stem 101. After the sleeve has been adjusted it may be locked in adjusted position by a set screw 111.

The tubular extension 108 is suitably provided with an interiorly threaded flange 112 and rotatably mounted therein is an exteriorly threaded sleeve 113. Sleeve 113 is thereby rotatable to advance or withdraw the same with respect to said flange 112, and may be provided in its end with slots to facilitate the rotation thereof. The motor vessel of a thermostat is suitably attached, as by the screws 114, to said flange 112. As here shown, the thermostatic motor is of the cup-type construction, and as in the embodiment of Fig. 1 the outer wall 115 is the outer wall of the device. The thermostatic motor chamber 116 is completed by the corrugated flexible wall 117 attached at one end to the annular member 118, which is suitably sealed to the wall 115, and attached at its opposite end to a rigid end wall 119. Attached to or held in engagement with wall 119 is the flange 120 of a sleeve 121 which is provided at its end with a flange 122 adapted to engage the flange 105. Housed within the sleeve 121 is a spring 123 interposed between the flange 105 and a plug 124 shown as threaded into the end of the sleeve and therefore adjustable within the sleeve to predetermine the initial tension of the spring 121. Interposed between flange 120 and a shoulder 125 within the sleeve 113 is a coil spring 126.

Chamber 116 is in communication through a suitable conduit 127, here shown as flexible, with a chamber 128 adapted to be suitably clamped in heat conducting relation with the wall 129 of any suitable tank, vat or other receptacle. Said chamber 128, the conduit 127 and the chamber 116 are charged with a suitable volatile fluid.

In this embodiment of the invention the valve stem 101 is normally held by the spring 126 with its shoulder 106 in contact with the end of the sleeve 107, which as heretofore explained is itself adjustable, and thereby the maximum flame is normally maintained. As the temperature within the receptacle 129 increases the vapor tension in chamber 116 increases, and when this vapor tension is sufficient to overcome the tension of spring 126 the wall 119 will commence to move and thereby move the valve stem 101 therewith because the flanges 105 and 122 are normally held in contact by the spring 123. Thereby the cross sectional passage through the V-shaped slot 100 is decreased until the proper flame is obtained for maintaining the desired temperature. If the temperature continues to rise and the chamber 116 continues to expand the minimum flame will be produced as in the embodiments heretofore described. If the minimum flame is secured with the seating portion 130 in contact with the seat 131, this embodiment contains no provision for completely closing the passage through the port 97, but if the seating portion 130 is left ungrooved, as heretofore explained, the port 97 is completely closed when the seating portion 130 engages the seat 131. In either event, after said seating portion has contacted the seat 131 further movement of the valve stem 101, together with its stem 102 and cap 103, is prevented. The thermostatic chamber 116, however, can continue to expand, the sleeve 121 advancing with respect to the cap 104 against the tension of the spring 123, as will be readily apparent, and therefore the development of undue pressures within the thermostat is prevented.

Figure 7:
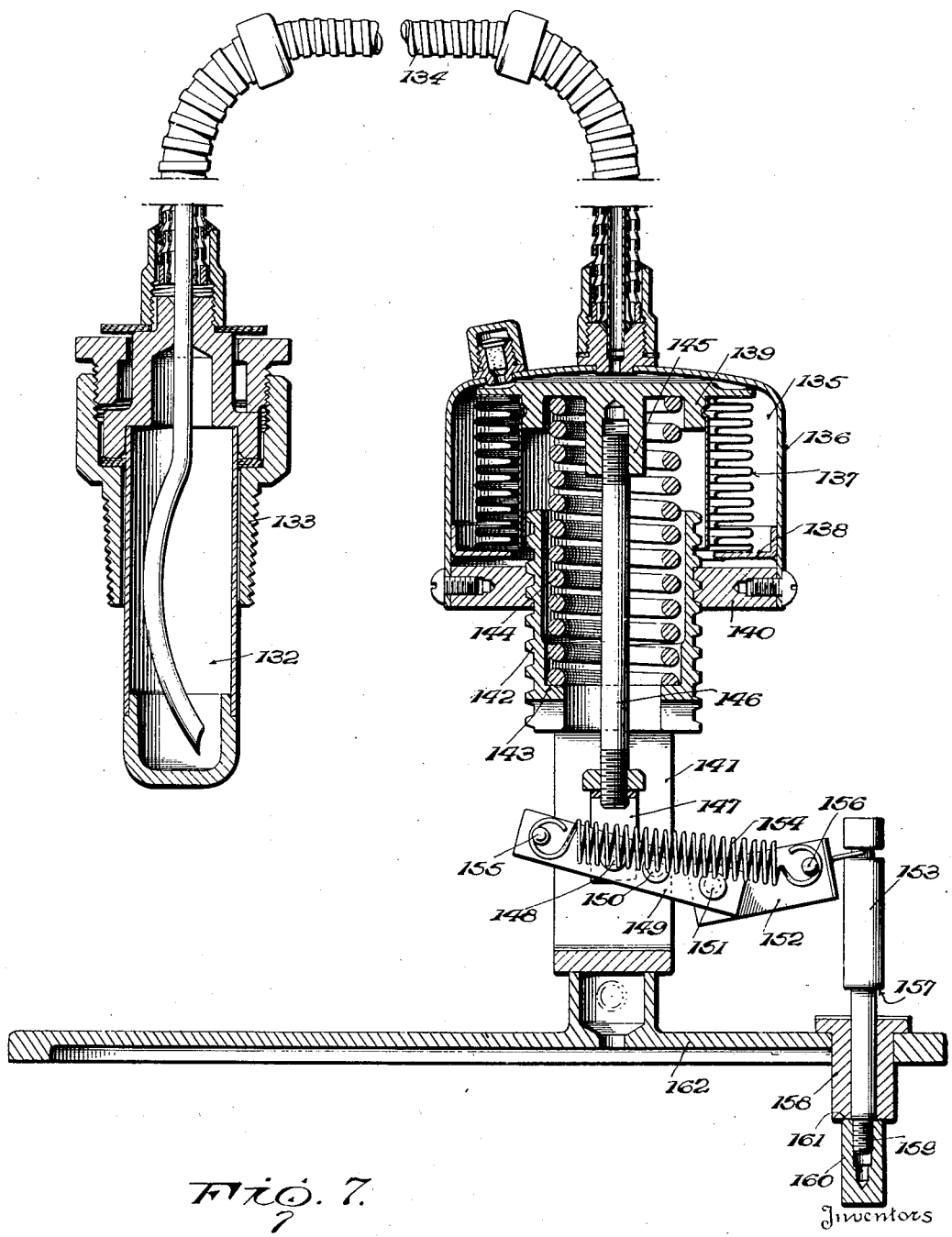
Fig. 7 is an axial section of a further embodiment of the present invention.

In the embodiment of Fig. 7 the thermostat is composed of a bulb 132 which may be suitably mounted in the wall of a tank, vat or other container by means of the threaded sleeve 133. Said bulb 132 communicates through a suitable conduit 134, here shown as flexible, with a motor chamber 135. This chamber is again shown as of cup-type construction and composed of an outer rigid wall 136, an inner flexible corrugated wall 137, an annular member 138 hermetically sealed to the end of the flexible wall and to the wall 136, and a relatively rigid end wall 139 also hermetically sealed to the flexible wall 137. As in the embodiment of Fig. 6 wall 136 is extended and suitably attached, as by screws, to an interiorly threaded flange 140 carried by a framework 141. Cooperating with the threads of flange 140 is an exteriorly threaded sleeve 142 provided with an interior shoulder 143 between which and the end wall 139 is a coil spring 144.

End wall 139 has an interiorly threaded boss 145 to which is attached the threaded end of a stem 146, which carries at its outer end, as by the threaded connection illustrated, a bifurcated member 147. Pivotally mounted in said member 147 at 148 is a link 149 which is pivoted on the frame 141 at 150. Pivotally connected to link 149 at 151 is a second link 152 suitably attached to a reciprocating stem 153. A coil spring 154 is attached to the links 149 and 152 at 155 and 156 respectively, and the mechanism as so far described constitutes a snap action device which will move member 153 inwardly or outwardly when by reason of the expansion or contraction of the chamber 135 the link 149 has been so moved about its pivot 150 as to cause the line of pull of the spring 154 to pass to one side or the other of the line of pivots. Stem 153 has a shoulder 157 on one side of a guide and stop sleeve 158, while the opposite end thereof is threaded at 159 and carries a cap 160 which provides a shoulder at 161. Shoulders 157 and 161 cooperate with the end of the sleeve 158 to afford a stop for limiting the extent of movement of the stem 153 inwardly or outwardly with respect to the plate 162. Stem 153 is connected to or in contact with any suitable valve mechanism or other device to be operated.

Figure 8:
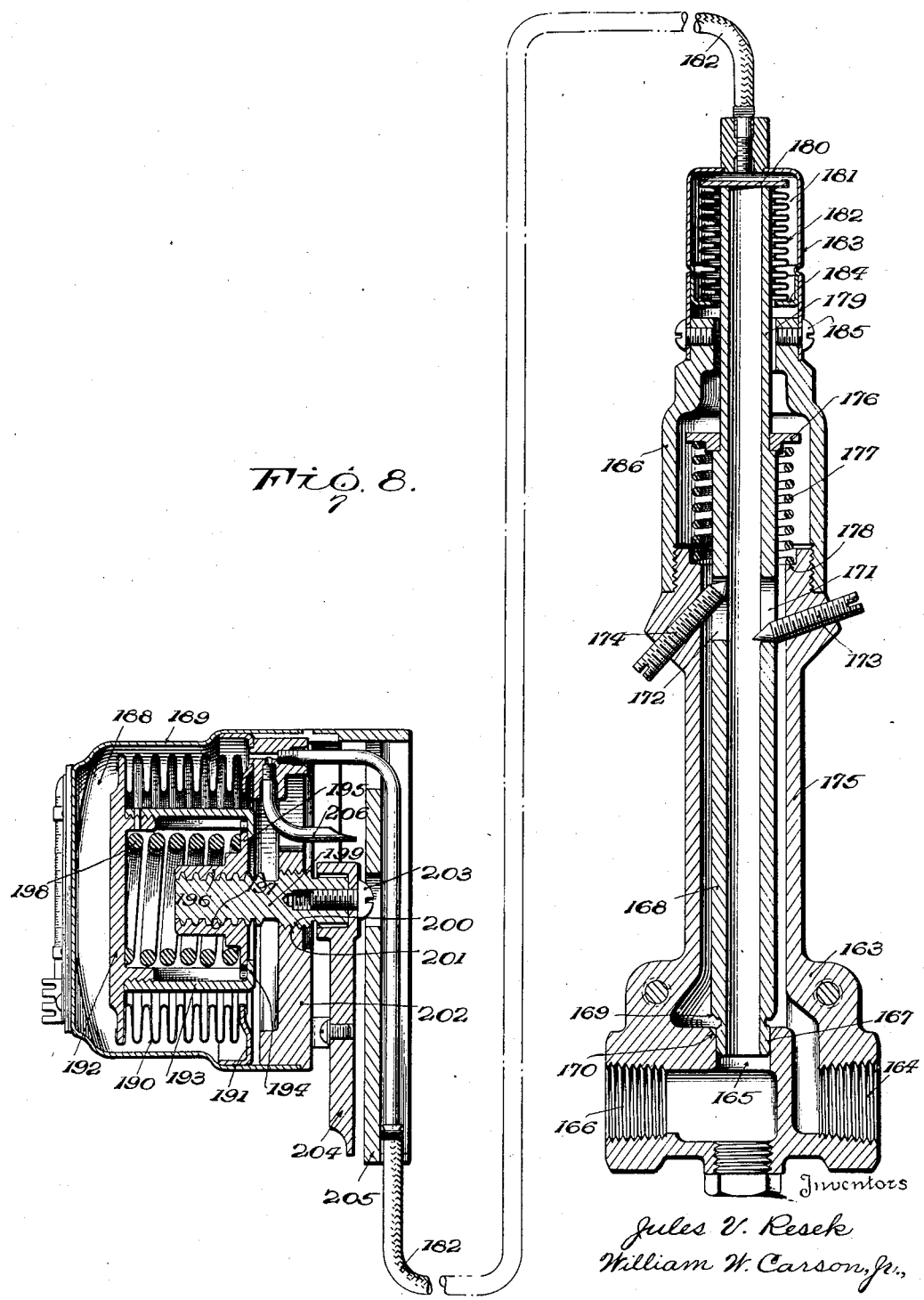
Fig. 8 is an axial section through yet another embodiment of the present invention.

In this embodiment of the invention it will be perceived that the spring 144 predetermines the temperature at which the chamber 135 begins to expand, while the construction of the snap action device predetermines the degree to which said chamber 135 must be expanded in order for the stem 153 to be actuated. The temperature of actuation can be predetermined by adjusting the sleeve 142 with respect to the flange 140 to vary the tension of spring 144 and therefore the vapor tension that must exist in the chamber 135 before the snap action device is so moved as to effect the operation of the stem 153. In the form shown in Fig. 8 the valve housing 163 has an inlet opening 164, a valve port 165 and an outlet opening 166. The guiding valve portion 167 reciprocates in the port 165 and has a V-shaped metering slot as heretofore described. The valve stem 168, as in earlier embodiments described, has a conical seating portion 169 for engagement with the seat 170 and said seating portion 169 may or may not have a groove for determining the minimum flame, as heretofore discussed in connection with the embodiment of Fig. 6. Stem 168 is provided with a pair of slots 171 and 172 with which coact a pair of set screws 173 and 174 respectively, the same being suitably mounted in a tubular extension 175 of the valve housing. Said set screws 173 and 174, by coaction with the ends of the slots 171 and 172 respectively, determine the limits of movement of the valve stem 168. Suitably formed on or attached to the valve stem 168 is a flange 176 with which coacts a coil spring 177 seated on a shoulder 178 in the tubular extension 175. Spring 177 normally holds the end of the slot 171 against the set screw 173 to determine the maximum flame, but said spring may yield until the end of the slot 172 is engaged with the set screw 174, which determines the minimum flame, although set screw 174 could be omitted or backed off so as to permit the seating portion 169 to engage the valve seat 170. Valve stem 168 has formed thereon or attached thereto an extension 179 which is suitably attached to or in contact with the end wall 180 of a thermostatic motor vessel 181 composed of said end wall 180, a flexible corrugated wall 182 attached thereto and an exterior or housing wall 183 to which the flexible corrugated wall is hermetically sealed by the annular member 184. Wall 183 is extended and suitably attached as by screws 185 to a housing member 186 suitably attached as by threads to the tubular extension 175.

Communicating with the chamber 181 is a conduit 182, here shown as flexible, which leads to the interior of an expansible and collapsible chamber 188 formed by an exterior housing wall 189 and an interior flexible corrugated wall 190 hermetically sealed to the wall 189 by means of the annular member 191 at one end and hermetically sealed to the relatively rigid end wall 192 at its opposite end. Wall 192 has suitably attached thereto a sleeve 193 provided with an inwardly directed shoulder 194. Normally engaged with said flange 194 is the flange 195 of an interiorly threaded nut 196 which is adjustably mounted on the threads 197 of a rotatable spindle 199. Interposed between the flange 195 and the end wall 192 is a coil spring 198. The opposite end of the spindle 199 is provided with a threaded portion 200 which is oppositely threaded with respect to the portion 197 and which cooperates with an interiorly threaded aperture 201 in a fixed plate 202 carried by a suitable frame. Stem 199 is extended beyond the plate 202 and has suitably attached thereto, as by the screw 203, an adjusting arm 204 which may also if desired act as a pointer and cooperate with indications on a dial plate 205.

By rotating the arm 204 the spindle 199 advances or withdraws the nut 196 and through spring 198 advances or withdraws end wall 192 in order to vary the volume of the chamber 188. The chambers 181 and 188, together with communicating conduit 182, of this embodiment of the invention, are charged with a non-volatile liquid, and therefore by changing the volume of chamber 188 the volume of the chamber 181 may be varied to advance or withdraw the valve portion 167 with respect to the port 165 and thereby change the temperature at which the valve stem is seated. If the volume of the chamber 188 is sufficiently increased, the valve stem 168 will be in its upwardmost position, and if the volume is further increased, a rise in temperature will be necessary in order to expand the liquid until it fills the chamber before valve stem 168 can be moved. A filling tube is shown at 206 through which the chambers and conduit aforesaid may be charged, after which said tube may be pinched together and soldered or otherwise suitably sealed.

In this embodiment it will be observed that the maximum and minimum flames are determined by the positions of the set screws 173 and 174, while the temperature at which the valve closes may be adjusted by the arm or pointer 204. Spring 177 normally holds the end of the slot 171 against the set screw 173, whereby the maximum flame is normally maintained. Expansion of the liquid within the chamber 188, in response to a rise of temperature in the medium, as the ambient air, to which the chamber is subjected produces an expansion of the chamber 181 and the consequent advancement of the valve portion 167 into the port 165, to reduce the flow of oil through said port, this action continuing until the minimum flame is produced when the end of the slot 172 engages the set screw 174—or if preferred, the minimum flame or a complete closure of the valve port could be effected by the engagement of the seating portion 169 with the seat 170, as heretofore explained, when the set screw 174 is backed off or omitted. In any event, after the valve member has advanced to its limit position with respect to the seat, further movement, whether by engagement with set screw 174 or seat 170, is prevented, and if thereafter the temperature continues to increase, with a consequent tendency to increase the volume of chamber 188, wall 192 may move against the tension of the spring 198, flange 194 separating from flange 195.

It will therefore be perceived that means have been provided whereby an oil valve may be automatically adjusted in conformity with the temperature to be controlled, whether the same be air in a room or other compartment or any suitable material in a tank, vat or other receptacle. While certain embodiments have been shown as provided with thermostats suitable for mounting on the wall of a room or other compartment, or on the valve itself, while other embodiments have been shown as provided with bulbs adapted to be inserted through a wall of a receptacle or mounted in heat conducting relation with the wall of a receptacle, it is to be expressly understood that the particular forms of thermostat mechanism associated with the varying forms of automatic metering valves have been selected for purposes of illustration only, as the temperature responsive elements of each of the various embodiments can be varied to take other forms that have been illustrated, or be associated with any other suitable valve. While some embodiments employ a volatile fluid in the thermostat while others use liquid expansion, this may also be varied or interchanged to conform with the use to which the device is put. The metering slot of the valve may also be varied in size and shape to conform with the flow of oil desired in its different positions of adjustment and movement.

It will also be observed that the present invention not only provides for the automatic metering of the oil valve, but also provides for an exact predetermination of the maximum flame and the minimum flame, and the adjustment of either or both to conform with the oil being used. Furthermore it provides for an accurate predetermination of the initial temperature at which the temperature responsive element of the thermostat shall become operative in initiating the movement of the valve.

Additionally, means have been provided whereby a continued rise of temperature after the minimum flame has been produced will eventually completely close the valve and extinguish even the minimum flame, and means have also been provided whereby the continued rise in temperature, after the minimum flame has been produced or the valve has been completely closed, is accompanied by a relative movement in the train of connections between the expansible and collapsible elements and the valve so that improper pressures will not build up in the expansible and collapsible chambers and tend to rupture the same. While varying combinations of these several features have been shown in the several embodiments it will be understood that other combinations of these several features can also be obtained within the invention, it being within the contemplation thereof that the automatic metering valve will be provided with varying combinations of these several features depending upon the particular use to which the automatic metering valve is put.

It will also be apparent that the automatic metering valve of the present invention is simple in construction, strong, durable and rugged in service, and easy to install and adjust. While several embodiments of the present invention have been illustrated and described with considerable particularity it is to be expressly understood that the invention is not restricted thereto, as the same is capable of receiving a variety of mechanical expressions, as will now be apparent to those skilled in the art, while changes may be made in the details of construction, arrangement, and proportion of parts without departing from the spirit of the present invention. Various forms of thermostats may be used, various constructions of valve mechanism may be employed and various means for mounting, enclosing, adjusting, and connecting the various parts may be utilized, so long as they are within the principles of the invention as herein set forth. Reference is therefore to be had to the appended claims for a definition of the limits of the invention.

What is claimed is:

1. An automatic metering oil valve including a valve member provided with a metering slot, thermostatic means associated with said valve member and adapted to operate the same, and a plurality of springs adapted to oppose said thermostatic means and successively engaged and brought into operation when the maximum flame is to be reduced and when the minimum flame has been reached.

2. An automatic metering oil valve including a valve member provided with a metering slot, thermostatic means associated with said valve member and adapted to operate the same, means for normally maintaining said valve member in a position to produce a predetermined maximum flame, said means being yieldable under the action of said thermostatic means to permit movement of said member to diminish the size of said flame after said thermostatic means has expanded to a predetermined position corresponding to the normal position of said valve member, and means for preliminarily adjusting said normal position of said valve member and therefore the size of said maximum flame.

3. An automatic metering oil valve including a valve member provided with a metering slot, thermostatic means associated with said valve member and adapted to operate the same, and means for normally maintaining said valve member in a position to produce a predetermined maximum flame, said means being yieldable under the action of said thermostatic means to permit movement of said member to diminish the size of said flame after said thermostatic means reaches a predetermined temperature, said thermostatic means being normally spaced from said last named means whereby a predetermined expansion of said thermostatic means occurs before said yieldable means becomes operative.

4. An automatic metering oil valve including a valve member provided with a metering slot, thermostatic means associated with said valve member and adapted to operate the same, means for normally maintaining said valve member in a position to produce a predetermined maximum flame, said means being yieldable under the action of said thermostatic means to permit movement of said member to diminish the size of said flame after said thermostatic means reaches a predetermined temperature, said thermostatic means being normally spaced from said last named means whereby a predetermined expansion of said thermostatic means occurs before said yieldable means becomes operative, and means for adjusting the spacing of said thermostatic means with respect to said yielding means.

5. An automatic metering oil valve including a valve member provided with a metering slot, thermostatic means associated with said valve member and adapted to operate the same, and means for normally limiting the movement of said valve member so as to obtain a predetermined minimum flame, said last named means being yieldable in the event that said thermostatic means continues thereafter to expand.

6. An automatic metering oil valve including a valve member provided with a metering slot, thermostatic means associated with said valve member and adapted to operate the same, means for normally limiting the movement of said valve member so as to obtain a predetermined minimum flame, said last named means being yieldable in the event that said thermostatic means continues thereafter to expand, and means to adjust said limiting means and therefore the size of said minimum flame.

7. An automatic metering oil valve including a valve member provided with a metering slot, thermostatic means associated with said valve member and adapted to operate the same, yielding means for normally maintaining said valve member in a position to maintain a predetermined maximum flame until said thermostatic means has expanded to a predetermined position, and means constituting a stop for the movement of said valve member to predetermine the minimum flame to be maintained.

8. An automatic metering oil valve including a valve member provided with a metering slot, thermostatic means associated with said valve member and adapted to operate the same, yielding means for normally maintaining said valve member in a position to maintain a predetermined maximum flame until said thermostatic means has expanded to a predetermined position, means constituting a stop for the movement of said valve member to predetermine the minimum flame to be maintained, and means for adjusting said stop to vary said minimum flame.

9. An automatic metering oil valve including a valve member provided with a metering slot, thermostatic means associated with said valve member and adapted to operate the same, yielding means for normally maintaining said valve member in a position to maintain a predetermined maximum flame until a predetermined temperature has been reached, means constituting a stop for the movement of said valve member to predetermine the minimum flame to be maintained, and means for adjusting said valve member to predetermine the maximum flame to be maintained.

10. An automatic metering oil valve including a valve member provided with a metering slot, thermostatic means associated with said valve member and adapted to operate the same, means for normally maintaining said valve member in a position for producing a predetermined maximum flame, said means being yieldable to permit said valve member to be moved after a predetermined temperature has been reached, and yieldable means for opposing expansion of said thermostatic means until a predetermined temperature has been reached.

11. An automatic metering oil valve including a valve member provided with a metering slot, thermostatic means associated with said valve member and adapted to operate the same, means for normally maintaining said valve member in a position for producing a predetermined maximum flame, said means being yieldable to permit said valve member to be moved after a predetermined temperature has been reached, yieldable means for opposing expansion of said thermostatic means until a predetermined temperature has been reached, and means for adjusting said first named yieldable means.

12. An automatic metering oil valve including a valve member provided with a metering slot, thermostatic means associated with said valve member and adapted to operate the same, means for normally maintaining said valve member in a position for producing a predetermined maximum flame, said means being yieldable to permit said valve member to be moved after a predetermined temperature has been reached, yieldable means for opposing expansion of said thermostatic means until a predetermined temperature has been reached, and means for adjusting the force opposing said thermostatic means.

13. An automatic metering oil valve including a valve member provided with a metering slot, thermostatic means associated with said valve member and adapted to operate the same, resilient means for normally opposing the expansion of said thermostat, and a second resilient means for normally maintaining said valve member in a position for producing a predetermined maximum flame, said last named resilient means adding its tension to the tension of said first named resilient means throughout the operation of said valve member.

14. An automatic metering oil valve including a valve member provided with a metering slot, thermostatic means associated with said valve member and adapted to operate the same, a spring normally opposing the expansion of said thermostatic means, said thermostatic means being normally spaced from said valve member, a second spring for normally maintaining said valve member in a position for producing a predetermined maximum flame, and means for adjusting the space between said thermostatic means and said valve member.

15. An automatic metering oil valve including a valve member provided with a metering slot, thermostatic means associated with said valve member and adapted to operate the same, a valve operating member normally spaced from said thermostatic means, means for adjusting the space between said thermostatic means and valve operating member, separate springs for opposing expansion of said thermostatic means and the movement of said valve member, and means for adjusting said valve operating member independently of said spring for opposing movement of said thermostatic means.

16. An automatic metering oil valve including a valve member provided with a metering slot, thermostatic means associated with said valve member and adapted to operate the same, means interposed between said valve member and said thermostatic means for moving said valve member to reduce the flame as said thermostat expands, resilient means for preventing movement of said valve member until said thermostat has obtained a predetermined temperature, and an abutment for normally stopping said valve member in a position to maintain a minimum flame.

17. An automatic metering oil valve including a valve member provided with a metering slot, thermostatic means associated with said valve member and adapted to operate the same, means interposed between said valve member and said thermostatic means for moving said valve member to reduce the flame as said thermostat expands, resilient means for preventing movement of said valve member until said thermostat has obtained a predetermined temperature, an abutment for normally stopping said valve member in a position to maintain a minimum flame, and a spring normally opposing movement of said abutment but yieldable when said thermostatic means continues to expand.

18. An automatic metering oil valve including a valve member provided with a metering slot, thermostatic means associated with said valve member and adapted to operate the same, means interposed between said valve member and said thermostatic means for moving said valve member to reduce the flame as said thermostat expands, an abutment for normally stopping the movement of said valve member in a position to maintain a minimum flame, and means whereby said valve will be completely closed upon the continued rise of temperature.

19. An automatic metering oil valve including a valve member provided with a metering slot, thermostatic means associated with said valve member and adapted to operate the same, means interposed between said valve member and said thermostatic means and adapted to move said valve member to reduce the flame after the thermostatic means has reached a predetermined temperature, an abutment for normally stopping the movement of said valve member in a position to maintain a minimum flame, a spring for permitting movement of said abutment if the temperature continues to increase, and means for completely closing the valve after a predetermined movement of said abutment.

20. An automatic metering oil valve including a valve member provided with a metering slot, thermostatic means associated with said valve member and adapted to operate the same, means interposed between said valve member and said thermostatic means and adapted to move said valve member to reduce the flame after the thermostatic means has reached a predetermined temperature, an abutment for normally stopping the movement of said valve member in a position to maintain a minimum flame, a spring for permitting movement of said abutment if the temperature continues to increase, means for completely closing the valve after a predetermined movement of said abutment, and means for predetermining the temperature at which said valve will be completely closed.

21. An automatic metering oil valve including a valve member provided with a metering slot, thermostatic means associated with said valve member and adapted to operate the same, means interposed between said valve member and said thermostatic means and adapted to move said valve member to reduce the flame after the thermostatic means has reached a predetermined temperature, an abutment for normally stopping the movement of said valve member in a position to maintain a minimum flame, a spring for permitting expansion of said thermostatic means if the temperature continues to increase, and means for adjusting said spring to predetermine the pressure at which said spring may yield.

22. An automatic metering oil valve including a valve member provided with a metering slot, thermostatic means associated with said valve member and adapted to operate the same, an operating means interposed between said valve member and said thermostatic means and adapted to be moved by said thermostatic means to reduce the flame, a plurality of springs, and means adapted to add said springs successively to the resistance to expansion of said thermostatic means after predetermined degrees of expansion of said thermostatic means.

23. An automatic metering oil valve including a valve member provided with a metering slot, thermostatic means associated with said valve member and adapted to operate the same, an operating means interposed between said valve member and said thermostatic means and adapted to be moved by said thermostatic means to reduce the flame, a plurality of springs, means adapted to bring said springs into action in succession after predetermined degrees of expansion of said thermostatic means, and means to adjust the intervals before the bringing into action of said springs.

24. An automatic metering oil valve including a valve member provided with a metering slot, thermostatic means associated with said valve member and adapted to operate the same, an operating means interposed between said valve member and said thermostatic means and adapted to be moved by said thermostatic means to reduce the flame, a plurality of springs, means adapted to bring said springs into action in succession after predetermined degrees of expansion of said thermostatic means, and means to adjust said operating means to predetermine the opposition to expansion of said thermostatic means.

25. An automatic metering oil valve including a valve member provided with a metering slot, thermostatic means associated with said valve member and adapted to operate the same, an operating means interposed between said valve member and said thermostatic means and adapted to be operated by said thermostatic means to move said valve member to reduce the flame, a spring for normally opposing expansion of said thermostatic means, a second spring for normally opposing expansion of said valve operating means, an abutment for normally stopping said valve member in a position to maintain a minimum flame, and a spring upon which said abutment is mounted to yield upon a continued rise in temperature.

26. An automatic metering oil valve including a valve member provided with a metering slot, thermostatic means associated with said valve member and adapted to operate the same, an operating means interposed between said valve member and said thermostatic means and adapted to be operated by said thermostatic means to move said valve member to reduce the flame, a spring for normally opposing expansion of said thermostatic means, a second spring for normally opposing expansion of said valve operating means, and means whereby said second spring is brought into action after a predetermined degree of expansion of said thermostatic means.

27. An automatic metering oil valve including a valve member provided with a metering slot, thermostatic means associated with said valve member and adapted to operate the same, an operating means interposed between said valve member and said thermostatic means and adapted to be operated by said thermostatic means to move said valve member to reduce the flame, a spring for normally opposing expansion of said thermostatic means, a second spring for normally opposing expansion of said operating means, means whereby said springs act in succession, and means whereby the interval between the action of said springs may be adjusted.

28. An automatic metering oil valve including a valve member provided with a metering slot, thermostatic means associated with said valve member and adapted to operate the same, an operating means interposed between said valve member and said thermostatic means and adapted to be operated by said thermostatic means to move said valve member to reduce the flame, a spring for normally opposing expansion of said thermostatic means, a second spring for normally opposing expansion of said operating means, and means for adjusting said operating means to predetermine the temperature at which said thermostatic means starts to move said valve member.

29. An automatic metering oil valve including a valve member provided with a metering slot, thermostatic means associated with said valve member and adapted to operate the same, an operating means interposed between said valve member and said thermostatic means and adapted to be operated by said thermostatic means to move said valve member to reduce the flame after said thermostatic means has expanded to a predetermined position, a spring for normally opposing expansion of said thermostatic means, a second spring for opposing movement of said valve member and expansion of said thermostatic means after said thermostatic means has reached said predetermined position, and a third spring brought into operation after a predetermined movement of said valve member to a position for maintaining a minimum flame and yieldable to permit said valve member to be completely closed.

30. An automatic metering oil valve including a valve member provided with a metering slot, thermostatic means associated with said valve member and adapted to operate the same, an operating means interposed between said valve member and said thermostatic means and adapted to be operated by said thermostatic means to move said valve member to reduce the flame, a spring for normally opposing expansion of said thermostatic means, a second spring for normally opposing expansion of said operating means, an abutment for normally stopping said valve member in a position to maintain a minimum flame, and means whereby said valve is completely closed if the temperature continues to increase.

31. An automatic metering oil valve including a valve member provided with a metering slot, thermostatic means associated with said valve member and adapted to operate the same, an operating means interposed between said valve member and said thermostatic means and adapted to be moved by said thermostatic means to move the valve member and reduce the flame after said thermostatic means has reached a predetermined temperature, a second member adapted to completely close the port through said valve, and means whereby said last named means becomes effective only after said valve member has reached the limit of its movement.

32. An automatic metering oil valve including a valve member provided with a metering slot, thermostatic means associated with said valve member and adapted to operate the same, an operating means interposed between said valve member and said thermostatic means and adapted to be moved by said thermostatic means to move said valve member to reduce the flame, means associated with said valve member whereby a minimum flame is maintained when said valve member reaches its limit position, a second member associated with said valve operating member and adapted to completely close the port through said valve, and means for permitting relative movement of said last named member to said first named member after said valve member has reached its limit position.

33. An automatic metering oil valve including a valve member provided with a metering slot, thermostatic means associated with said valve member and adapted to operate the same, an operating means interposed between said valve member and said thermostatic means and adapted to be operated by said thermostatic means to move said valve member and reduce said flame, means for predetermining the temperature at which said valve member begins to move, a second member associated with said valve operating member and adapted to close the port through said valve by movement relatively to said valve operating member, and yieldable means for preventing said relative movement as long as said valve member is free to move.

34. An automatic oil valve including a valve member provided with a metering slot, thermostatic means associated with said valve member and adapted to operate the same but movable independently thereof, an operating means interposed between said valve member and said thermostatic means and adapted to be operated by said thermostatic means, and means for predetermining the movements of said valve member to predetermine the size of the maximum and minimum flames to be maintained.

35. An automatic oil valve including a valve member provided with a metering slot, thermostatic means associated with said valve member and adapted to operate the same but movable independently thereof, an operating means interposed between said valve member and said thermostatic means and adapted to be operated by said thermostatic means, and means for predetermining the movements of said valve member to predetermine the size of the maximum and minimum flames to be maintained, said means being adjustable to vary the size of the maximum and minimum flames.

36. An automatic oil valve including a valve member provided with a metering slot, thermostatic means associated with said valve member and adapted to operate the same but movable independently thereof, an operating means interposed between said valve member and thermostatic means and adapted to be operated by said thermostatic means, means for predetermining the movements of said valve member to predetermine the size of the maximum and minimum flames to be maintained, and means for normally maintaining said valve member in position to maintain the maximum flame.

37. An automatic oil valve including a valve member provided with a metering slot, thermostatic means associated with said valve member and adapted to operate the same, an operating means interposed between said valve member and said thermostatic means and adapted to be operated by said thermostatic means, means for predetermining the movements of said valve member to predetermine the size of the maximum and minimum flames to be maintained, and yieldable means whereby said thermostatic means may continue to expand after said valve member has moved to its position for maintaining a minimum flame.

38. An automatic oil valve including a valve member provided with a metering slot, thermostatic means associated with said valve member and adapted to operate the same, an operating means interposed between said valve member and said thermostatic means and adapted to be moved by the latter to move said valve member and reduce the flame, and means for predetermining the normal position of said valve member to maintain a predetermined maximum flame independent of the contraction of the thermostatic means.

39. An automatic metering oil valve comprising in combination a valve provided with a port and a valve member having a V-shaped slot and adapted to enter said port to vary the effective area through said V-shaped slot, thermostatic means, an operating means interposed between said valve member and said thermostatic means and adapted to be operated by said thermostatic means to reduce the effective area through said slot, resilient means disposed externally of said operating means for normally opposing expansion of said thermostatic means in all positions of adjustment of said thermostatic means, and means for adjusting said thermostatic means with respect to said operating means independently of said resilient means.

40. An automatic metering oil valve comprising in combination a valve provided with a port and a valve member having a V-shaped slot and adapted to enter said port to vary the effective area through said V-shaped slot, thermostatic means, an operating means interposed between said valve member and said thermostatic means and adapted to be operated by said thermostatic means to reduce the effective area through said slot, resilient means normally opposing movement of said thermostatic means, and means for adjusting said thermostat with respect to said operating means without varying the adjustment of said resilient means.

41. An automatic metering oil valve comprising in combination a valve provided with a port and a valve member having a V-shaped slot and adapted to enter said port to vary the effective area through said V-shaped slot, thermostatic means, an operating means interposed between said valve member and said thermostatic means and adapted to be operated by said thermostatic means to reduce the effective area through said slot, separate and consecutively acting springs for normally opposing expansion of said thermostatic means and said valve member, and means to adjust the range of movement of said valve member.

42. An automatic metering oil valve comprising in combination a valve provided with a port and a valve member having a V-shaped slot and adapted to enter said port to vary the effective area through said V-shaped slot, thermostatic means, an operating means interposed between said valve member and said thermostatic means and adapted to be operated by said thermostatic means to reduce the effective area through said slot, means for stopping said valve member in a position to maintain a minimum flame, and means for completely closing said valve after a predetermined rise in temperature.

43. An automatic metering oil valve comprising in combination a valve provided with a port and a valve member having a V-shaped slot and adapted to enter said port to vary the effective area through said V-shaped slot, thermostatic means, an operating means interposed between said valve member and said thermostatic means and adapted to be operated by said thermostatic means to reduce the effective area through said slot, resilient means for normally opposing the movement of said valve member toward closing position, an abutment for normally stopping said valve member in a position to maintain a minimum flame, and a second spring upon which said abutment is mounted whereby said abutment may yield as the temperature continues to rise.

44. An automatic metering oil valve comprising in combination a valve provided with a port and a valve member having a V-shaped slot and adapted to enter said port to vary the effective area through said V-shaped slot, thermostatic means, an operating member interposed between said valve member and said thermostatic means and adapted to be operated by said thermostatic means to reduce the effective area through said slot, a separate member for completely closing the port through said valve, and resilient means normally preventing relative movement between said last named member and said valve operating member but yieldable to permit said last named member to become effective after said valve member has reached a limit position.

45. An automatic metering oil valve comprising in combination a valve provided with a port and a valve member having a V-shaped slot and adapted to enter said port to vary the effective area through said V-shaped slot, thermostatic means, an operating means interposed between said valve member and said thermostatic means and spaced from said thermostatic means when the latter is cold, means for displacing said thermostat and varying its spacing from said operating means to predetermine the temperature at which said thermostatic means moves into operative en- 46. An automatic metering oil valve comprising in combination a valve provided with a port and a valve member having a V-shaped slot and adapted to enter said port to vary the effective area through said V-shaped slot, thermostatic means, an operating means interposed between said valve member and said thermostatic means, means for normally holding said operating means in a position to maintain a maximum flame, an abutment for arresting the movement of said valve member to maintain a minimum flame, and means for adjusting the size of said flame including an adjustable stop cooperating with the valve operating means to limit the movement of said valve member without stopping the movement of said thermostatic means.

47. An automatic metering oil valve comprising in combination a valve provided with a port and a valve member having a V-shaped slot and adapted to enter said port to vary the effective area through said V-shaped slot, thermostatic means, an operating means interposed between said valve member and said thermostatic means, resilient means for normally holding said operating means in a position to maintain a maximum flame, an abutment for arresting the movement of said valve member to maintain a minimum flame, and resilient means acting independently of said first-named resilient means and coacting with said thermostatic means for permitting the same to yield after a predetermined pressure has been built up in said thermostatic means.

48. An automatic metering oil valve comprising in combination a valve provided with a port and a valve member having a V-shaped slot and adapted to enter said port to vary the effective area through said V-shaped slot, thermostatic means, an operating means interposed between said valve member and said thermostatic means, means for normally holding said operating means in a position to maintain a maximum flame, an abutment for arresting said valve member to maintain a minimum flame, and means whereby said valve is completely closed after a further predetermined rise in temperature.

49. An automatic oil valve including a valve member provided with a metering slot, thermostatic means associated with said valve member and adapted to operate the same, an operating means interposed between said valve member and said thermostatic means and adapted to be operated by said thermostatic means, said operating means being hollow to vent one side of said valve, and means for predetermining the movements of said valve member to predetermine the size of the maximum and minimum flames to be maintained.

JULES V. RESEK.
WILLIAM W. CARSON, Jr.